United States Patent [19]
Ebbing

[11] Patent Number: 6,003,769
[45] Date of Patent: Dec. 21, 1999

[54] SYSTEM FOR READING AND ERASING DATA ON A CHIP CARD

[75] Inventor: Georg Ebbing, Langenhagen, Germany

[73] Assignee: Ustra Hannoversche Verkehrsbetriebe AG, Hannover, Germany

[21] Appl. No.: 08/973,473

[22] PCT Filed: Jun. 14, 1996

[86] PCT No.: PCT/EP96/02570

§ 371 Date: May 1, 1998

§ 102(e) Date: May 1, 1998

[87] PCT Pub. No.: WO97/00500

PCT Pub. Date: Jan. 3, 1997

[30] Foreign Application Priority Data

Jun. 17, 1995 [DE] Germany .......................... 195 22 029

[51] Int. Cl.⁶ .................................................. G06K 5/00
[52] U.S. Cl. .......................... 235/380; 235/382; 235/487; 235/492
[58] Field of Search ................................... 235/380, 379, 235/382, 492, 487

[56] References Cited

U.S. PATENT DOCUMENTS

| | | | |
|---|---|---|---|
| 4,797,542 | 1/1989 | Hara | 235/380 |
| 4,843,223 | 6/1989 | Shino | 235/487 |
| 4,914,279 | 4/1990 | Massey | 235/449 |
| 5,015,830 | 5/1991 | Masuzawa et al. | 235/441 |
| 5,179,505 | 1/1993 | Matsuo | 235/495 |
| 5,272,319 | 12/1993 | Rey | 235/379 |
| 5,276,311 | 1/1994 | Hennige | 235/380 |
| 5,288,978 | 2/1994 | Iijima | 235/380 |
| 5,293,424 | 3/1994 | Holtey et al. | 235/382 |
| 5,532,466 | 7/1996 | Konno et al. | 235/441 |
| 5,541,398 | 6/1996 | Hanson | 235/375 |
| 5,728,998 | 3/1998 | Novis et al. | 235/380 |
| 5,775,929 | 7/1998 | Hashiguchi | 235/441 |

FOREIGN PATENT DOCUMENTS

| | | |
|---|---|---|
| 0 385 290 | 2/1990 | European Pat. Off. . |
| 2 663 142 | 6/1991 | France . |
| 2 683 062 | 10/1991 | France . |
| 36 36 700 | 4/1987 | Germany . |
| 36 32 294 | 4/1988 | Germany . |
| 40 18 772 | 6/1990 | Germany . |
| 42 13 797 | 10/1993 | Germany . |
| 42 29 863 | 3/1994 | Germany . |
| 42 20 809 | 5/1994 | Germany . |
| 94 05 280 U | 7/1994 | Germany . |

Primary Examiner—Thien Minh Le
Assistant Examiner—Daniel St. Cyr
Attorney, Agent, or Firm—Shlesinger, Arkwright & Garvey, LLP

[57] ABSTRACT

A system for reading and erasing data on a chip card is disclosed. At least one set of data associated to at least one issuer is stored on the chip card and the sets of data associated to different issuers are mutually separated. The device has substantially flat, hand-held housing, a current supply arranged in the housing, a read/erase device arranged in the housing, a slot in one of the narrow sides of the housing for inserting the chip card into the housing in the area of the read/erase device, a control device for controling the device and a display linked to the read/erase device to display as a page at least one set of data stored on the chip card.

22 Claims, 4 Drawing Sheets

SYSTEM FOR READING AND ERASING DATA ON A CHIP CARD

FIELD OF THE INVENTION

The invention concerns apparatus for reading and erasing chip (microprocessor) cards comprising a microprocessor and storing at least one file relating to at least one issuer and consisting of at least one data set and having a header wherein are stored all information and codes for secure accessing, the data from different issuers being mutually separate.

BACKGROUND OF THE INVENTION

Chip cards having a storage component illustratively in the form of a microchip or a magnetic strip are widely known. They are used for many purposes, for instance as telephone cards, health insurance cards, check cards, credit cards, user identification or the like. The chip cards are issued to the user by the particular issuer of the data stored on the card, that is the post office, a health insurance, a credit institution or the like.

A read and/or write apparatus is required to read the data stored on the chip card or to write data into the chip card, and as a rule said apparatus is stationary, for instance in a cardphone or in an automatic teller.

Accordingly a card user can access the chip card data for purposes of reading and/or writing only at the locally fixed apparatus. Moreover such locally fixed read and/or write apparatus are costly and cumbersome. As a result the applicability of chip cards is restricted.

Apparatus with which to individually mark passes and the like in electronic manner is known from the German patent document 40 18 772 A1 and comprises a housing receiving a power supply and a write device to write data formed by a short code onto the chip card. A slot to insert a chip card into the housing and into the zone of the write device is present at one of the n arrow sides of the housing. The apparatus comprises an operating device in the form of a keyboard. The apparatus also is fitted with a line display. This known apparatus is used to feed a short code, for instance a PIN (personal identification number), through the keyboard panel and to store it in a read/write memory of a chip card. The known apparatus serving exclusively to write data on a chip card and the line display swerving exclusively to monitor the applied code, reading and displaying of data stored on a chip card is precluded by the known apparatus.

A chip card called a "multifunction card" is known from the European patent document 0 385 290 A1 and comprises a memory allowing storing a predetermined number of different data sets. The chip card comprises several display panels and also a keyboard. Several data sets are stored in the operative known chip card, each data set representing the data stored on a particular credit card. The particular data sets are selected by means of the keyboard and the data represented by the data sets, for instance name of credit card owner, credit card numeral or signature of credit card owner, can be displayed in the display panels. Modifying the data stored on the multifunction card is both undesired and precluded.

OBJECTS AND SUMMARY OF THE INVENTION

The object of the invention is to create a chip card read and/or write apparatus storing at least one file related to an issuer and consisting of at least one data set and comprising a header storing all information and codes for secure access, the files of different issuers being separate, said apparatus allowing to read data stored on the chip card or writing on the chip card regardless of locally fixed systems and being of simple and economical design.

This problem is solved by the disclosure of claim 1.

Essentially the apparatus of the invention comprises a substantially flat, handheld housing receiving the devices needed to read from, display and/or to write on chip cards, in particular a power supply and a read/write unit and a display. Thereby is created a transportable, handheld apparatus making possible readout from, display of and/or writing on chip cards independently of locally fixed installations.

By means of the apparatus of the invention, the user is provided with a page-like readout of the data sets stored on the chip card and can obtain rapid overview of all data stored on the chip card by means of the display.

Especially advantageous chip cards are those allowing to store the files of different issuers, the data sets related to different issuers being stored separately from one another and their contents being determinable by the issuer itself. A data set to be stored is stored in the memory in memory sites which as a whole result in a rigorously defined information content and in this manner can be represented as one page. Illustratively a data set may be eligibility (for instance a travel ticket, an admission card, a seat reservation, a voucher), documentation (for instance a sales slip, a membership card, a professional ID, a receipt), information (for instance a time table, an address, the parking site of a car in a garage, a hotel room number), or advertizing.

If for instance the chip card is used to store travel tickets of a local traffic service and if therefore the data sets are travel tickets, then the user, before setting out, can read the data sets stored on the chip card to make sure a data set representing a valid travel ticket is stored on the memory card. When beginning the trip, the particular data set on the chip card then can be canceled of devalued electronically, illustratively in reading and/or writing equipment installed in a city travel facility or in apparatus of the invention for instance carried by a conductor.

Another application for the apparatus of the invention is to represent the data sets as receipts, for instance of particular commercial enterprises. When purchasing, the user may have the apparatus of the invention on him and by reading the data sets stored on the chip card then can gain rapidly and easily an overview of his expenditures up to that time. When the user no longer needs the receipts, he may erase the relevant data sets using the apparatus of the invention.

The shape, size and outer geometry of the apparatus may be selected within wide limits.

The subclaims disclose advantageous and appropriate further developments of the invention.

BRIEF DESCRIPTION OF THE DRAWINGS

The invention is elucidated below by illustrative embodiments shown in the drawings.

DETAILED DESCRIPTION OF THE INVENTION

Figure 1:
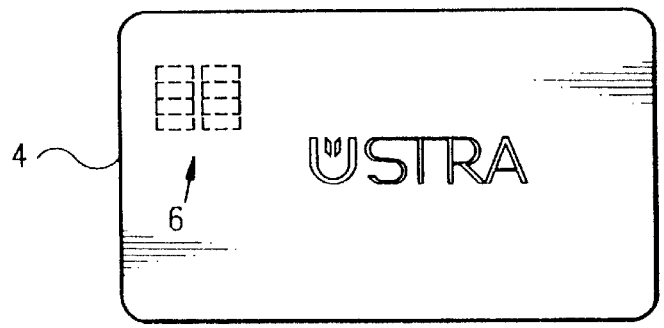
FIG. 1 is a topview of a chip card.

FIG. 1 shows a chip (microprocessor) card 2 consisting of a flat plastic card body 4 into which is embedded an omitted memory. A panel of contacts 6 is mounted on one of the flat sides of the chip card and consists of several contacts connected to the memory terminals. Access to the zone of the memory is made possible by means of the contact panel 6 and a read and/or write device further described below, for instance to read or to erase data sets stored on the chip card 2.

Figure 2:
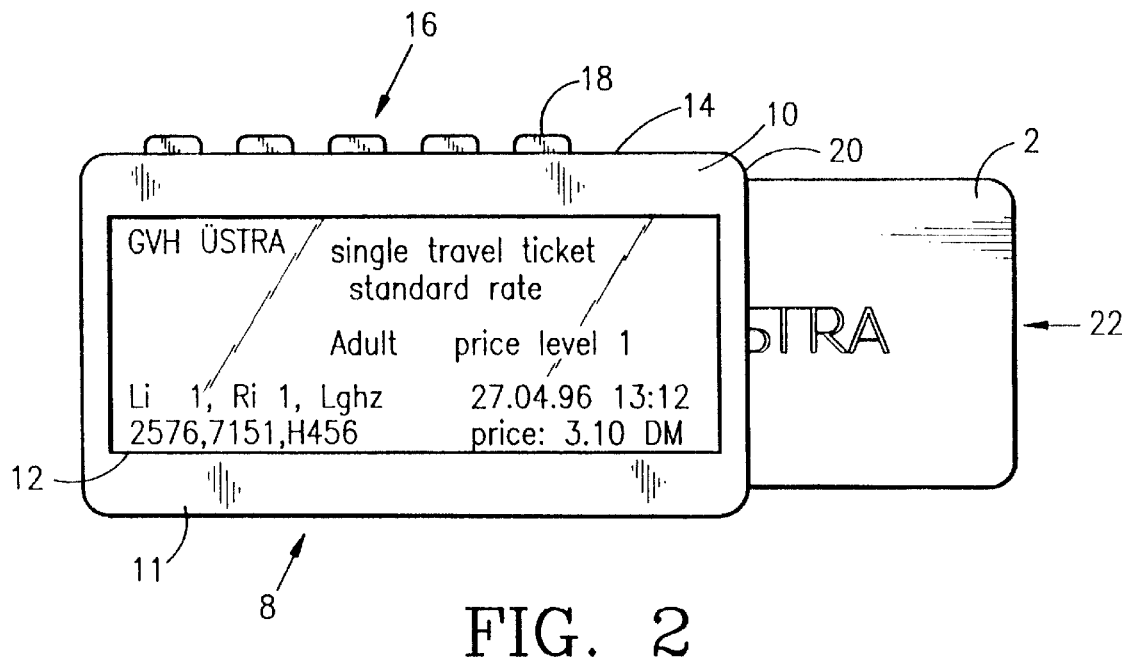
FIG. 2 is a topview of a first illustrative embodiment of the apparatus of the invention with a partly inserted chip card.

FIG. 2 shows apparatus 8 to read from and/or write on chip cards and comprises a flat, handheld housing 10. An LCD display panel 12 (hereafter display 12) is mounted on one flat side 11 of the housing 10 to display on that side a data sets stored in the chip card 2. In this embodiment the size of the display 12 is selected in such manner that a particular data set can be displayed on the chip card 2. The housing comprises a keyboard 16 at a narrow side 14, said keyboard consisting of several keys of which only one is denoted by the reference 18. Using the keys 18, the user can operate the apparatus, for instance he may turn it ON or OFF and may read data sets stored in the chip card and reproduce them or cancel them on the display.

A slot not shown in the topview is present in a narrow side 20 to allow inserting the chip card 2 into the inside of the housing 10 as far as the read/write device not shown in the drawing.

FIGS. 1 and 2 show that the topview size of the housing 10 substantially corresponds to the topview size of the chip card 2.

When being used, the chip card 2 is inserted in such manner into the housing 10 that the contact panel 6 makes electrical contact with the read/write device. In this read/write configuration, the chip card 2 can be fully received in the housing 10, or, as shown in FIG. 2, partly. The read/write device reads data sets stored on the chip card 2 and directly, or indirectly through a control device such as a microprocessor, drives the display 12 which then represents, in the form of a page, a particular data set stored on the chip card 2. This feature is shown in FIG. 2 illustratively as a page of a data set stored on the chip card 2 representing a local traffic travel ticket.

Figure 3:
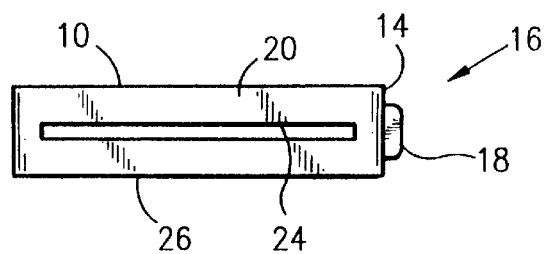
FIG. 3 is an elevation of a narrow side of the apparatus of FIG. 2.

FIG. 3 is an elevation in the direction of an arrow 22 pointing at the apparatus of FIG. 2. It is clear that the housing 10 is flat. Furthermore a slot 24 is present in the narrow side 20 to insert the chip card inside the housing 10, the inside width of the slot 24 substantially corresponding to the cross-section of the chip card 2. A switch, not shown, may be present inside the housing 10 so that when the chip card 2 is inserted into the housing 10, for instance the power is turned ON to at least a portion of the apparatus 8 or the read/write device shall be initiated.

When the apparatus 8 is being used, the flat side 26 of the housing 10 may rest on the user's palm and the keyboard 16 can be operated with the fingers of said palm. Accordingly the apparatus 8 can be operated with one hand.

Figure 4:
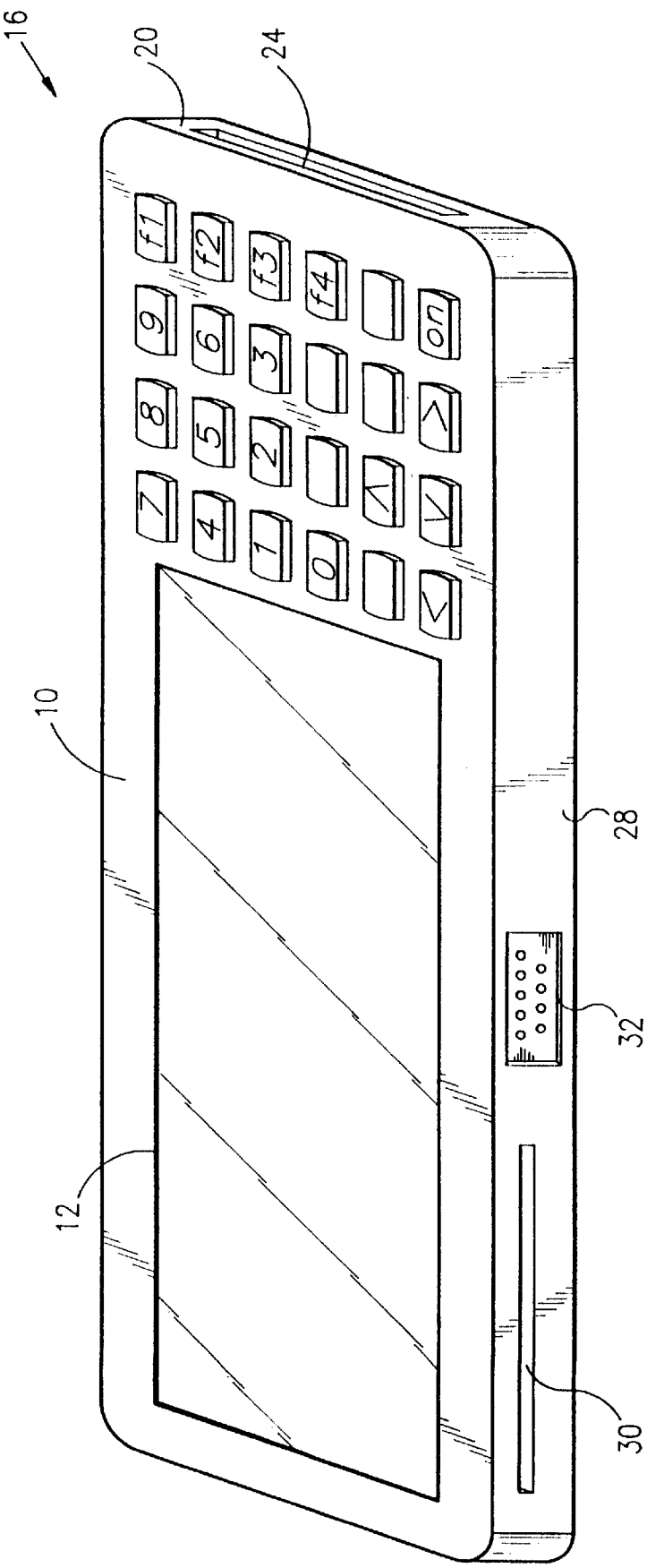
FIG. 4 is a perspective of a second embodiment of the apparatus of the invention.

FIG. 4 shows another embodiment of the apparatus of the invention. The same references as used in FIGS. 2 and 3 are used for the same components. In this embodiment the flat housing 10 comprises a display 12 of which the size is selected in such manner that several data sets stored on the chip card 2 can be displayed simultaneously. Furthermore the keyboard 16 is mounted on the flat side and comprises a numeric panel, for instance to enter a code identifying the user. The slot 24 to insert the chip card, omitted from this Figure, inside the housing 10 is formed in the narrow side 20. Furthermore the housing 10 comprises a clearance 30 in the narrow side 28 allowing insertion of a paper strip, omitted from this Figure, into the housing 10 and into the zone of an omitted printer. The printer is used for a paper strip printout of the data sets stored on the chip card 2.

The housing 10 also comprises at its narrow side 28 an interface 32 allowing connection of an omitted data cable by means of which the apparatus' read/write device can be connected to a PC or to an external storage medium.

Means are present inside the housing 10 for mechanically prestressing the chip card 2 against the direction of insertion. The chip card 2 snaps into the housing 10 and is ejected by an ejection device.

Figure 5:
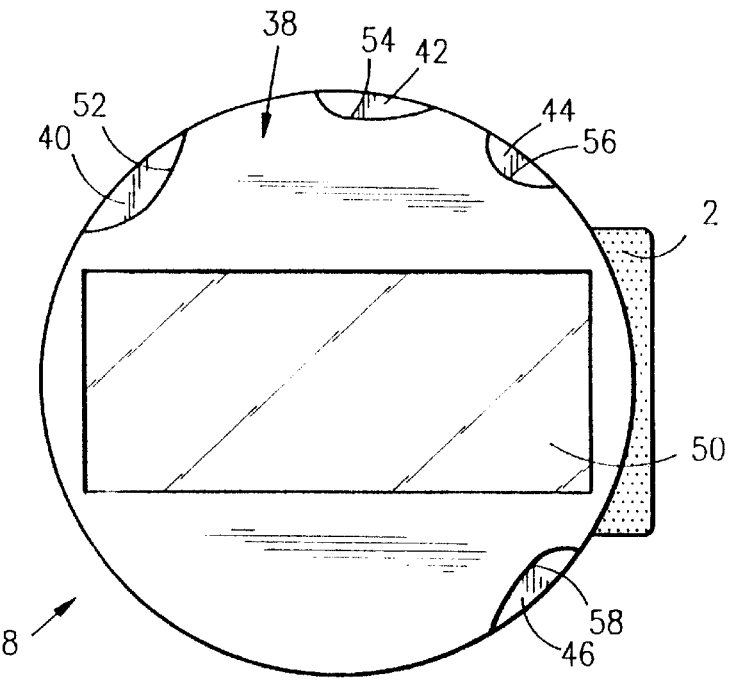
FIG. 5 is a topview of a third embodiment of the apparatus of the invention, FIG. 6 schematically shows the occupancy of the memory in a chip card.
Figure 6:
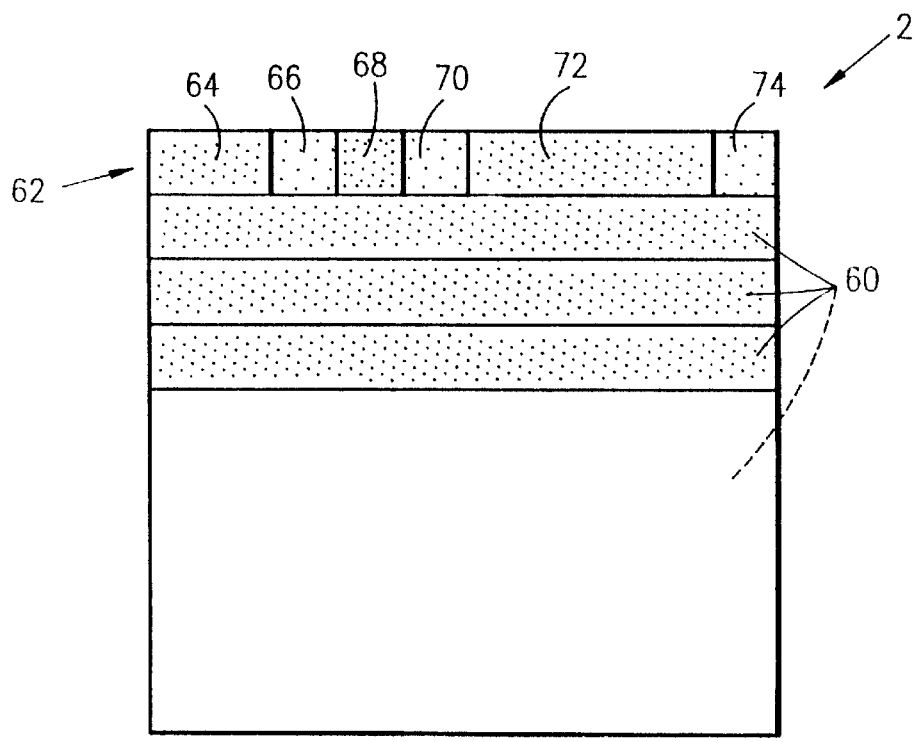

FIGS. 5 through 7 are discussed next.

FIG. 5 shows apparatus 8 to read from and/or write on chip (processor) cards 2, said apparatus 8 comprising a circular housing 38 assuming the shape of a case approximately the size of a saucer or a hand. Keys 40, 42, 44, 46 to operate apparatus 8 are mounted on the housing circumference. An LCD display 50 is present approximately centrally on one of the flat sides 48. An omitted slot to insert the chip (processor) card 2 is present in the cylindrical circumferential surface of the housing 38.

The keys 40, 42, 44 and 46 are ergonometrically distributed over part of the circumference of the housing 38 for one-hand operation so that when holding the housing 38 in one's hand, the fingers shall substantially rest on the keys. Preferably the keys when in their rest position are flush with the circumferential surface and preferably are mounted inside arcuate clearances 52, 54, 56 and 58 in the edge.

FIG. 6 schematically shows the memory of chip card 2 storing various files composed of one or more data sets 60. The files comprise a header 62 which can be in the form of an intrinsic, dedicated file, or it may be in the form of one or several data sets in the file itself. All information and codes 64 assuring secure access are present in the header 62. Only the data issuer (for instance a service provider) may generate the data, read them, change or erase them. Another service provider can read the data only when permitted to do so by the data issuer in the form of a read code. The owner of the chip card 2 can read and erase all data without authorization by the particular issuer; however the said owner cannot generate or modify the data. The header 62 furthermore contains data 66 identifying the particular issuer, data 68 relating to the numeral of the device that generated the file and information 70 relating to the kind of data. Moreover the header 62 comprises a zone 72 containing a summary description of the data in plain text. Lastly the schematic and illustrative chip card shown in FIG. 6 also contains a zone 74 holding information about which group of issuers the file must be related to.

The data sets of various files also may all be stored as chained lists in one file because the header allows unambiguously accessing the mutually associated data sets. The data sets 60 contain the data contents proper, for instance an electronic travel ticket.

The owner of the apparatus 8 typically will carry this apparatus on his person. As described above, the apparatus is selected in size in such manner that the owner can conveniently hold it in his hand, for instance the left one, and that his fingers lie accurately on the keys.

If the user and owner of apparatus 8 wants an overview of the various eligibilities and information of his chip card, then he inserts the chip card 2 into the apparatus 8 and thereby the initial procedures of recognition and authorization take place between chip card and apparatus. Said procedures being in the state of the art, they are not discussed further herein. The apparatus is turned ON as long as the chip card remains inserted.

Figure 7A:
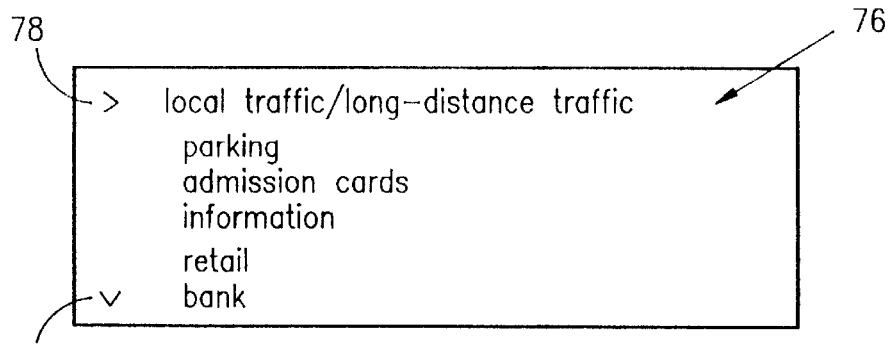
FIG. 7a–7d show various displays of the apparatus of the invention.
Figure 7B:
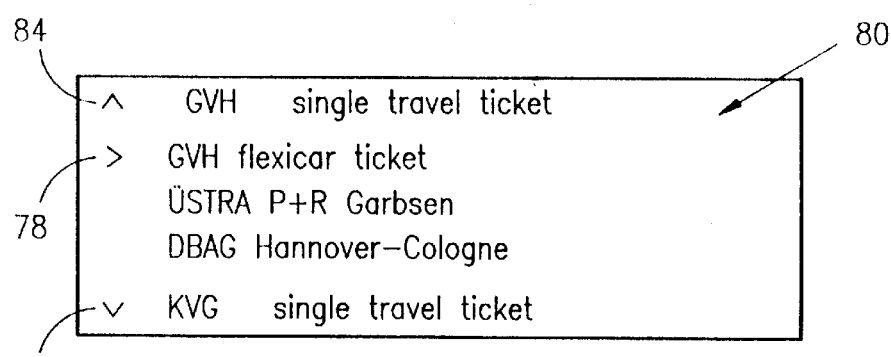

Initially the apparatus 8 offers a first overview 76 on the display 50 as indicated by FIG. 7a. This first overview 76 reproduces the information stored in the header 74 of the chip card 2 and relating to the groups of issuers. The contents of this first overview 76 alternatively may also be located in the program of the apparatus 8 when such contents are rigorously predetermined, for instance following agreement with issuers. In the embodiment shown in FIG. 7a, said overview consists of six lines. Each line of this overview relates to one group of issuers.

A flag 78 appears in the uppermost line in the first column. Using the key 40, this flag 78 can be moved to lines directly below. After the flag has been moved to the desired location due to repeated depressing of the key 40, the key 42 is depressed. Following selection of the desired group of issuers, and with the help of the information 74 of the header 62 of the chip card 2, the program searches all files of this group of issuers and reproduces a second overview 80 on the display 50 (FIG. 7b) of the file summaries stored in the area 72 of the header 62. Using the keys 40 and 42, the selection procedure already described above for the overview can thus be carried out.

Furthermore there may be also one or several sequential pages for the overviews 76 and 80, as indicated by the flag 82. The key 46 then allows the user of the apparatus 8 to select the further pages. Any previous pages are indicated by an flag 84; the user then can select the previous pages using the key 44. When changing pages, the marker 78 obviously is transferred into the upper or lower line of the particular overview.

Figure 7C:
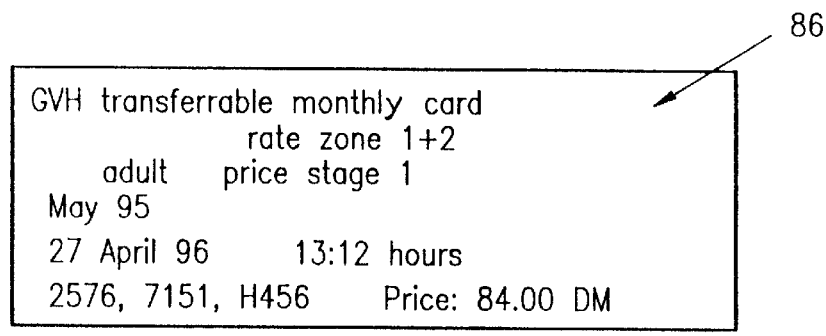

Following the selection procedure and selecting a line of the overview 80 using the key 42, the program opens the data sets 60 belonging to that page and if said sets were compressed will decompress them, and represents them on the display 50 as a page 86 as shown in FIG. 7c. Page 86 lists the information written by the service provider, for instance the local traffic service in this case, into the chip, in plain text.

The data of the data sets are organized as pages and consequently the display will always be represented similarly. This is the case also when the chip card is read in a public service apparatus or in a computer chip card readout. All information, the data themselves, furthermore the meanings, are stored, possibly compressed or coded, in the data sets associated with the page. This procedure offers the advantage that the information issuer need not agree about contents, for instance the meaning of given data, with other issuers. If the issuer knows its data, he also can reinterpret them for monitoring purposes. Each issuer itself configures its eligibility ticket according to content and form. Thus one page corresponds for instance to a travel ticket. The principle remaining unchanged, the user easily understands the operation.

Sequential pages may exist, as they do relative to the overview 76, 80, in the actual display pages 86, said sequential pages being selectable using the same procedure by means of the flags 78, 82, 84 and keys 44 and 46.

The program of the apparatus 8 is designed in such manner that after depressing the key 46, the second overview 80 (FIG. 7b) shall be shown, whereby another selection is possible.

Figure 7D:
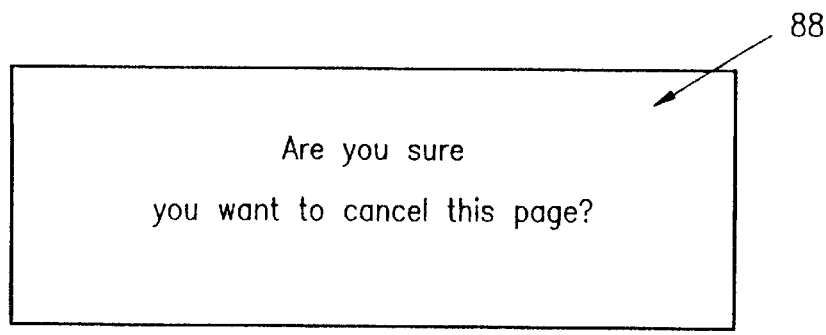

The user can erase one page, and any ensuing pages, by selecting the corresponding page and simultaneously depressing the keys 40 and 46. Thereupon the apparatus 8 shows an inquiry 88 on the display as illustrated in Fig. 7d. If upon said inquiry 88 the user depresses the key 42, the apparatus 8 will erase the corresponding page(s).

The key array of the apparatus 8 shown in FIG. 5 is merely didactic. However this illustration shows that 4-key operation is possible.

The file header 62 of the chip card 2 may comprise a varying amount of information and codes as already described above. However it may also include language codes.

I claim:

1. A system for reading and erasing data on a chip card, comprising:

a) said chip card comprising at least one memory;
   b) said memory including a plurality of files related to respective plurality of issuers, each of said files including at least one set of data, each file of each issuer being separate from one another;
   c) said at least one set of data including a header containing a plurality of data zones including data identifying a particular issuer, data relating to a device that generated the file, code data defining an access procedure, and summary data describing the data in a text format;
   d) a read/erase device to read/erase said at least one set of data stored in said memory;
   e) said read/erase device being disposed within a substantially flat housing adapted to be hand held, said housing having a slot in one of said housing narrow sides configured for said chip card to be inserted into said housing;
   f) a display operably connected to said read/erase device to display said at least one set of data, said display being operably associated with said housing; and
   g) said at least one set of data is organized so as to be represented as a page on said display.

2. A system as in claim 1, wherein each header for respective file is displayed in a first overview in such a manner that said file is related line-wise to the issuer and is selected using an operating device.

3. A system as in claim 1, wherein each header includes a summary description of the respective file and is displayed in a second overview.

4. A system as in claim 1, wherein:

a) one of said files contains related data sets of various files stored as chained lists; and
   b) said one of said files includes a header for accessing said related data sets.

5. A system as in claim 1, wherein said display includes a display panel.

6. A system as in claim 5, wherein said display panel is configured to display simultaneously at least one page stored in said chip card.

7. A system as in claim 5, wherein said display panel is a LCD display.

8. A system as in claim 5, wherein;
a) said housing includes a flat side; and
b) said display panel is mounted on said flat side.

9. A system as in claim 8, wherein the size of said display panel corresponds substantially to the size of said flat side.

10. A system as in claim 1, wherein said chip card is received substantially fully within said housing.

11. A system as in claim 1, and further comprising a keyboard including a plurality of keys.

12. A system as in claim 11, wherein said keys are mounted on a narrow side of said housing.

13. A system as in claim 11, wherein:
a) said housing is shaped as a circular box having a circumferential surface;
b) said keys and said slot are mounted on said circumferential surface; and
c) said display is mounted approximately centrally on a flat surface of said circular box.

14. A system as in claim 13, wherein said keys are mounted ergonomically for one-hand operation on said circumferential surface such that when holding said housing, the fingers of the user rest against said keys.

15. A system as in claim 13, wherein:
a) said keys are flush with said circumferential surface when in a rest position; and
b) said keys are disposed in arcuate clearances along an edge of said housing.

16. A system as in claim 1, and further comprising:
a) a printer disposed within said housing, said printer being operably connected to said read/erase device; and
b) said housing includes a clearance for insertion of a paper strip to said printer.

17. A system as in claim 1, wherein said read/erase device includes a switch disposed within said housing for being actuated by said chip card.

18. A system as in claim 17, and further comprising:
a) a power supply disposed within said housing and operably connected to said read/erase; and
b) said switch turns ON said power supply to at least a portion of said system.

19. A system as in claim 17, wherein said switch actuates one of said read/erase device and display.

20. A system as in claim 18, wherein said power supply includes at least one battery.

21. A system as in claim 1, and further comprising an interface connected to said read/erase device for connection to an external device.

22. A system as in claim 1, wherein said chip card snaps into said housing and is ejected by an ejection device.

* * * * *